US010114424B2

(12) United States Patent
Campbell et al.

(10) Patent No.: US 10,114,424 B2
(45) Date of Patent: Oct. 30, 2018

(54) MULTI-PIVOT HINGE

(71) Applicant: Microsoft Technology Licensing, LLC, Redmond, WA (US)

(72) Inventors: John Campbell, Puyallup, WA (US); Brian Bitz, Sherwood, OR (US); Errol Mark Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/239,417

(22) Filed: Aug. 17, 2016

(65) Prior Publication Data
US 2016/0357226 A1    Dec. 8, 2016

Related U.S. Application Data

(63) Continuation of application No. 14/555,184, filed on Nov. 26, 2014, now Pat. No. 9,625,954.

(51) Int. Cl.
*G06F 1/16* (2006.01)
*E05D 3/06* (2006.01)
*E05D 11/00* (2006.01)
*E05D 11/06* (2006.01)
*H04M 1/02* (2006.01)
(Continued)

(52) U.S. Cl.
CPC .............. *G06F 1/1681* (2013.01); *E05D 3/06* (2013.01); *E05D 7/12* (2013.01); *E05D 11/0054* (2013.01); *E05D 11/0081* (2013.01); *E05D 11/06* (2013.01); *E05D 11/1014* (2013.01); *G06F 1/1616* (2013.01); *H04M 1/022* (2013.01); *H04M 1/0216* (2013.01); *E05D 2007/128* (2013.01); *E05Y 2900/606* (2013.01)

(58) Field of Classification Search
CPC combination set(s) only.
See application file for complete search history.

(56) References Cited

U.S. PATENT DOCUMENTS

| 3,289,877 A | 12/1966 | Wolf |
| 4,355,666 A | 10/1982 | Torii |
| 4,611,710 A | 9/1986 | Mitsufuji |

(Continued)

FOREIGN PATENT DOCUMENTS

| CN | 103291737 A | 9/2013 |
| CN | 203669484 U | 6/2014 |

(Continued)

OTHER PUBLICATIONS

"Bi-Fold Hinges", captured by the Internet archive at <<http://catalog.monroehinge.com/category/bi-fold-hinges>> on May 9, 2012, 2 pages.

(Continued)

*Primary Examiner* — Lisa Lea Edmonds
(74) *Attorney, Agent, or Firm* — Rainier Patents, P.S.

(57) ABSTRACT

The description relates to devices, such as computing devices that have hinged portions. One example can include a first portion and a second portion. This example can also include a sequential multi-pivot hinge assembly rotatably securing the first portion and the second portion. The sequential multi-pivot hinge assembly can include rotation control elements configured to control a relative order of rotation around axes of rotation of the sequential multi-pivot hinge assembly.

19 Claims, 9 Drawing Sheets

(51) Int. Cl.
  *E05D 7/12* (2006.01)
  *E05D 11/10* (2006.01)

(56) References Cited

U.S. PATENT DOCUMENTS

| | | | |
|---|---|---|---|
| 4,617,699 | A | 10/1986 | Nakamura |
| 4,711,046 | A | 12/1987 | Herrgord |
| 4,845,809 | A | 7/1989 | Pillifant, Jr. |
| 5,056,192 | A | 10/1991 | Grass |
| 5,229,921 | A | 7/1993 | Bohmer |
| 5,448,799 | A | 9/1995 | Stein, Jr. |
| 5,456,195 | A | 10/1995 | Ozaku et al. |
| 5,509,590 | A | 4/1996 | Medeiros, Jr. |
| 5,796,575 | A | 8/1998 | Podwalny et al. |
| 5,845,366 | A | 12/1998 | Kuroda |
| 5,987,704 | A | 11/1999 | Tang |
| 6,223,393 | B1 * | 5/2001 | Knopf ............... G06F 1/1681 16/366 |
| 6,421,235 | B2 * | 7/2002 | Ditzik ............... G06F 1/1616 320/114 |
| 6,470,532 | B2 | 10/2002 | Rude |
| 6,505,382 | B1 | 1/2003 | Lam et al. |
| 6,527,036 | B1 | 3/2003 | Welsh |
| 6,754,081 | B2 | 6/2004 | Rude et al. |
| 6,757,160 | B2 | 6/2004 | Moore et al. |
| 6,831,229 | B1 | 12/2004 | Maatta et al. |
| 6,952,861 | B2 | 10/2005 | Ynosencio |
| 6,966,435 | B2 | 11/2005 | Weiser et al. |
| 7,140,074 | B2 | 11/2006 | Han et al. |
| 7,155,266 | B2 | 12/2006 | Stefansen |
| 7,227,741 | B2 | 6/2007 | Garel et al. |
| 7,251,129 | B2 | 7/2007 | Lee et al. |
| 7,293,380 | B2 | 11/2007 | Repecki |
| 7,418,766 | B2 | 9/2008 | Nelson et al. |
| 7,520,025 | B2 | 4/2009 | Hung |
| 7,584,524 | B2 | 9/2009 | Hung |
| 7,636,985 | B2 | 12/2009 | Greenbank |
| 7,758,082 | B2 | 7/2010 | Weigel et al. |
| 7,966,694 | B2 | 6/2011 | Estlander |
| 8,024,843 | B2 | 9/2011 | Endo et al. |
| 8,032,988 | B2 | 10/2011 | Lai et al. |
| 8,122,970 | B2 | 2/2012 | Palen |
| 8,170,630 | B2 | 5/2012 | Murayama et al. |
| 8,441,791 | B2 | 5/2013 | Bohn et al. |
| 8,451,601 | B2 | 5/2013 | Bohn et al. |
| 8,467,838 | B2 | 6/2013 | Griffin et al. |
| 8,590,857 | B2 | 11/2013 | Chen et al. |
| 8,624,844 | B2 | 1/2014 | Behar et al. |
| 8,649,166 | B2 | 2/2014 | Wu |
| 8,687,354 | B2 | 4/2014 | Uchiyama et al. |
| 8,687,359 | B2 | 4/2014 | Theobald et al. |
| 8,713,759 | B2 | 5/2014 | Cai |
| 8,743,538 | B2 | 6/2014 | Ashcraft et al. |
| 8,776,319 | B1 | 7/2014 | Chang et al. |
| 8,796,524 | B1 | 8/2014 | Deck |
| 8,797,727 | B2 | 8/2014 | Ashcraft et al. |
| 8,804,324 | B2 | 8/2014 | Bohn et al. |
| 8,826,495 | B2 | 9/2014 | Jauvtis et al. |
| 8,843,183 | B2 | 9/2014 | Griffin et al. |
| 8,854,834 | B2 | 10/2014 | O'Connor et al. |
| 9,047,055 | B2 | 6/2015 | Song |
| 9,243,432 | B2 * | 1/2016 | Lee ............... E05D 3/06 |
| 9,268,372 | B1 | 2/2016 | Hsu |
| 9,290,976 | B1 | 3/2016 | Horng |
| 9,371,676 | B2 | 6/2016 | Rittenhouse |
| 9,411,365 | B1 | 8/2016 | Tanner et al. |
| 9,625,947 | B2 * | 4/2017 | Lee ............... G06F 1/1616 |
| 9,625,953 | B2 * | 4/2017 | Bitz ............... G06F 1/1681 |
| 9,625,954 | B2 * | 4/2017 | Campbell ............... G06F 1/1681 |
| 2004/0091101 | A1 | 5/2004 | Park et al. |
| 2004/0266239 | A1 | 12/2004 | Kurokawa |
| 2005/0122671 | A1 * | 6/2005 | Homer ............... G06F 1/1618 361/679.27 |
| 2005/0155182 | A1 | 7/2005 | Han et al. |
| 2006/0005356 | A1 | 1/2006 | Amano et al. |
| 2006/0046792 | A1 | 3/2006 | Hassemer et al. |
| 2006/0079277 | A1 | 4/2006 | Ditzik |
| 2007/0039132 | A1 | 2/2007 | Jung et al. |
| 2007/0049376 | A1 | 3/2007 | Cho et al. |
| 2007/0107163 | A1 | 5/2007 | Barnett |
| 2007/0117600 | A1 | 5/2007 | Robertson et al. |
| 2007/0247799 | A1 | 10/2007 | Nie et al. |
| 2008/0112113 | A1 | 5/2008 | Sawadski et al. |
| 2008/0174089 | A1 | 7/2008 | Ekberg |
| 2008/0250604 | A1 | 10/2008 | Chen et al. |
| 2009/0147458 | A1 | 6/2009 | Wang et al. |
| 2010/0154171 | A1 | 6/2010 | Lombardi et al. |
| 2010/0232100 | A1 * | 9/2010 | Fukuma ............... F16G 13/18 361/679.01 |
| 2011/0000136 | A1 | 1/2011 | Brun |
| 2011/0099756 | A1 | 5/2011 | Chen |
| 2011/0177850 | A1 | 7/2011 | Griffin et al. |
| 2011/0292605 | A1 | 12/2011 | Chen |
| 2012/0046076 | A1 | 2/2012 | Masser et al. |
| 2012/0120618 | A1 | 5/2012 | Bohn |
| 2012/0120627 | A1 | 5/2012 | O'Connor et al. |
| 2012/0127471 | A1 | 5/2012 | Urushidani |
| 2012/0137471 | A1 | 6/2012 | Kujala |
| 2012/0147542 | A1 | 6/2012 | Kim |
| 2012/0206893 | A1 | 8/2012 | Bohn et al. |
| 2012/0272481 | A1 | 11/2012 | Ahn et al. |
| 2012/0279014 | A1 | 11/2012 | Carlsson |
| 2012/0307472 | A1 | 12/2012 | Bohn et al. |
| 2013/0014346 | A1 | 1/2013 | Ahn et al. |
| 2013/0046492 | A1 | 2/2013 | Westergaard |
| 2013/0081229 | A1 | 4/2013 | Hirano |
| 2013/0111704 | A1 | 5/2013 | Mitsui |
| 2013/0135809 | A1 | 5/2013 | Uchiyama et al. |
| 2013/0139355 | A1 | 6/2013 | Lee et al. |
| 2013/0152342 | A1 | 6/2013 | Ahn |
| 2013/0194741 | A1 | 8/2013 | Uchiyama et al. |
| 2013/0216740 | A1 | 8/2013 | Russell-Clarke |
| 2013/0219663 | A1 | 8/2013 | Cai |
| 2013/0318746 | A1 | 12/2013 | Kuramochi |
| 2014/0042293 | A1 | 2/2014 | Mok et al. |
| 2014/0084772 | A1 | 3/2014 | Zhang et al. |
| 2014/0111954 | A1 | 4/2014 | Lee et al. |
| 2014/0126133 | A1 | 5/2014 | Griffin et al. |
| 2014/0160055 | A1 | 6/2014 | Margolis et al. |
| 2014/0174226 | A1 | 6/2014 | Hsu et al. |
| 2014/0174227 | A1 * | 6/2014 | Hsu ............... E05D 3/14 74/98 |
| 2014/0196253 | A1 * | 7/2014 | Song ............... G06F 1/1601 16/225 |
| 2014/0196254 | A1 | 7/2014 | Song |
| 2014/0217875 | A1 * | 8/2014 | Park ............... H05K 5/0226 312/326 |
| 2014/0226275 | A1 | 8/2014 | Ko et al. |
| 2014/0239065 | A1 | 8/2014 | Zhou et al. |
| 2014/0245569 | A1 | 9/2014 | Cho |
| 2014/0246354 | A1 | 9/2014 | Probst et al. |
| 2014/0287804 | A1 | 9/2014 | Bohn et al. |
| 2014/0290008 | A1 | 10/2014 | Hsu |
| 2014/0290009 | A1 | 10/2014 | Kasai et al. |
| 2014/0338483 | A1 | 11/2014 | Hsu et al. |
| 2014/0352757 | A1 | 12/2014 | Ramirez |
| 2014/0360296 | A1 | 12/2014 | Hsu |
| 2015/0016040 | A1 | 1/2015 | Hood, III et al. |
| 2015/0153787 | A1 | 1/2015 | Mok et al. |
| 2015/0092331 | A1 | 4/2015 | Kinoshita et al. |
| 2015/0138103 | A1 | 5/2015 | Nishi |
| 2015/0138712 | A1 | 5/2015 | Solland |
| 2015/0176317 | A1 | 6/2015 | Lee |
| 2015/0227175 | A1 | 8/2015 | Motosugi |
| 2015/0277505 | A1 | 10/2015 | Lim et al. |
| 2015/0277506 | A1 * | 10/2015 | Cheah ............... G06F 1/1681 361/679.27 |
| 2015/0361696 | A1 * | 12/2015 | Tazbaz ............... H04M 1/022 361/679.27 |
| 2015/0362956 | A1 * | 12/2015 | Tazbaz ............... G06F 1/1637 361/679.27 |
| 2015/0370287 | A1 | 12/2015 | Ko et al. |

(56) References Cited

U.S. PATENT DOCUMENTS

| | | | |
|---|---|---|---|
| 2016/0132075 A1* | 5/2016 | Tazbaz | G06F 1/1681 361/679.27 |
| 2016/0132076 A1* | 5/2016 | Bitz | G06F 1/1681 361/679.27 |
| 2016/0139634 A1 | 5/2016 | Cho et al. | |
| 2016/0139639 A1 | 5/2016 | Dash et al. | |
| 2016/0147267 A1* | 5/2016 | Campbell | G06F 1/1681 361/679.27 |
| 2016/0187935 A1* | 6/2016 | Tazbaz | G06F 1/1681 361/679.03 |
| 2016/0201367 A1 | 7/2016 | Kato | |
| 2016/0215541 A1* | 7/2016 | Tazbaz | E05D 3/14 |
| 2016/0224072 A1 | 8/2016 | Huang et al. | |
| 2016/0349802 A1 | 12/2016 | Ahn et al. | |
| 2016/0357226 A1* | 12/2016 | Campbell | G06F 1/1681 |
| 2017/0090523 A1* | 3/2017 | Tazbaz | G06F 1/1681 |
| 2018/0059735 A1 | 3/2018 | Tazbaz et al. | |
| 2018/0066465 A1 | 3/2018 | Tazbaz et al. | |
| 2018/0088634 A1 | 3/2018 | Bitz et al. | |

FOREIGN PATENT DOCUMENTS

| | | |
|---|---|---|
| CN | 204553530 U | 8/2015 |
| EP | 0844357 A1 | 5/1998 |
| EP | 1340879 A2 | 9/2003 |
| EP | 1422593 A1 | 5/2004 |
| EP | 1464784 A1 | 10/2004 |
| EP | 2728433 A1 | 5/2014 |
| EP | 2765478 A2 | 8/2014 |
| EP | 2765479 A2 | 8/2014 |
| KR | 20140049911 A | 4/2014 |
| WO | 2016/077254 A1 | 5/2016 |

OTHER PUBLICATIONS

"Finger Protecta", retrieved from <<http://shop.stormflame.com/finger-protecta-142-p.asp>> on Sep. 9, 2014, 2 pages.

"Fingersafe", May 26, 2013, retrieved from <<http://fingersafe.com/>> on Sep. 9, 2014, 2 pages.

"Laptop back covers shell for Dell 15R 5520 7520 M521R 5525 PN T87MC laptop hinge cover", retrieved from <<http://www.alibaba.com/product-detail/Laptop-back-covers-shell-For-Dell_1628979107.html>> on Sep. 8, 2014, 3 pages.

"Moving Point Hinge-Multipivot Hinge", retrieved at: <<http://websystem.gismo.se/Gismo/files/1029/2.mph%2001%20introduktion.pdf>> on Oct. 9, 2014, 6 pages.

"Plastic Slatband Chains", retrieved at <<http://www.irp.co.za/wp-content/assets/LFC002-7.5-Straight-Running-Double-Hinge-Chain.pdf>> on Sep. 10, 2015, 1 page.

"Polyprop Boxes Accessories", Jun. 28, 2013, retrieved from <<http://www.presentingbinders.co.uk/Polyprop_Boxes_Accessories.html>> on Sep. 10, 2014, 6 pages.

"Samet SoftCover hinge wins the Innovation Award 2013", Feb. 8, 2013, retrieved from <<http://www.kozsusanidesign.com/samet-softcover-hinge-wins-the-innovation-award-2013/>> on Sep. 9, 2014, 2 pages.

Non-Final Office Action and Examiner Initiated Interview Summary dated Sep. 22, 2016 from U.S. Appl. No. 14/606,979, 27 pages.

Response and Demand filed Apr. 6, 2016 from PCT Patent Application No. PCT/U52015/059799, 20 pages.

Final Office Action dated Oct. 14, 2016 from U.S. Appl. No. 14/538,775, 63 pages.

Interview Summary filed Oct. 11, 2016 from U.S. Appl. No. 14/606,979, 2 pages.

Second Written Opinion dated Oct. 10, 2016 from PCT Patent Application No. PCT/US2015/060959, 7 pages.

Response filed Oct. 31, 2016 to the Final Office Action dated Jul. 29, 2016 from U.S. Appl. No. 14/588,138, 10 pages.

Notice of Allowability dated Oct. 24, 2016 from U.S. Appl. No. 14/555,184, 11 pages.

Corrected Notice of Allowability dated Oct. 31, 2016 from U.S. Appl. No. 14/555,184, 11 pages.

Second Written Opinion dated Oct. 31, 2016 from PCT Patent Application No. PCT/US2015/059799, 8 pages.

Response filed Nov. 28, 2016 to the Written Opinion dated Apr. 12, 2016 from PCT Patent Application No. PCT/US2016/013815, 10 pages.

Corrected Notice of Allowability dated Nov. 21, 2016 from U.S. Appl. No. 14/555,184, 6 pages.

Response filed Dec. 8, 2016 to the Second Written Opinion dated Oct. 31, 2016 from PCT Patent Application No. PCT/US2015/059799, 12 pages.

International Search Report and Written Opinion dated Nov. 14, 2016 from PCT Patent Application No. PCT/US2016/048898, 16 pages.

International Preliminary Report on Patentability dated Nov. 29, 2016 from PCT Patent Application No. PCT/US2015/064173, 6 pages.

Response filed Dec. 7, 2016 to the Second Written Opinion dated Oct. 10, 2016 from PCT Patent Application No. PCT/US2015/060959, 8 pages.

Response filed Dec. 13, 2016 to the Non-Final Office Action dated Sep. 22, 2016 from U.S. Appl. No. 14/606,979, 22 pages.

Supplemental Response filed Dec. 8, 2016 to the Response filed Jun. 30, 2016 from U.S. Appl. No. 14/538,786, 8 pages.

Applicant-Initiated Interview Summary dated Dec. 20, 2016 from U.S. Appl. No. 14/538,775, 3 pages.

Corrected Notice of Allowability dated Dec. 14, 2016 from U.S. Appl. No. 14/555,184, 6 pages.

Amended claims filed Dec. 22, 2016 from PCT Patent Application No. PCT/US2015/059798, 6 pages.

Notice of Allowance dated Dec. 27, 2016 from U.S. Appl. No. 14/538,786, 54 pages.

Response filed Jan. 3, 2017 to the Final Office Action dated Oct. 14, 2016 from U.S. Appl. No. 14/538,775, 9 pages.

Non-Final Office Action dated Jan. 6, 2017 from U.S. Appl. No. 14/866,697, 72 pages.

Second Written Opinion dated Jan. 2, 2017 from PCT Patent Application No. PCT/US2016/013815, 6 pages.

Corrected Notice of Allowability dated Jan. 13, 2017 from U.S. Appl. No. 14/538,786, 26 pages.

Non-Final Office Action dated Jan. 20, 2017 from U.S. Appl. No. 14/588,138, 12 pages.

Notice of Allowance dated Feb. 3, 2017 from U.S. Appl. No. 14/555,184, 18 pages.

International Preliminary Report on Patentability dated Jan. 24, 2017 from PCT Patent Application No. PCT/US2015/059799, 8 pages.

International Preliminary Report on Patentability dated Jan. 30, 2017 from PCT Patent Application No. PCT/US2015/059798, 6 pages.

Final Office Action dated Feb. 24, 2017 from U.S. Appl. No. 14/538,775, 42 pages.

Corrected Notice of Allowability dated Jan. 25, 2017 from U.S. Appl. No. 14/538,786, 6 pages.

Final Office Action and Examiner-Initiated Interview Summary dated Mar. 15, 2017 from U.S. Appl. No. 14/606,979, 56 pages.

International Preliminary Report on Patentability dated Mar. 3, 2017 from PCT Patent Application No. PCT/US2015/060959, 7 pages.

Corrected Notice of Allowability dated Mar. 16, 2017 from U.S. Appl. No. 14/555,184, 8 pages.

Response filed Apr. 20, 2017 to the Non-Final Office Action dated Feb. 24, 2017 from U.S. Appl. No. 14/538,775, 9 pages.

Response filed Apr. 10, 2017 to the Non-Final Office Action dated Jan. 20, 2017 from U.S. Appl. No. 14/588,138, 8 pages.

Corrected Notice of Allowability dated Mar. 21, 2017 from U.S. Appl. No. 14/538,786, 10 pages.

Response filed Mar. 29, 2017 to the Non-Final Office Action dated Jan. 6, 2017 from U.S. Appl. No. 14/866,697, 10 pages.

"Single and double hinge type LBP (820 & 821 LBP)", retrieved on Sep. 10, 2015, at <<http://www.papadopoulos-bros.gr/en/proionta/erpystries-metaforikes-tainies/erpystries/plastikes/eutheias/monou-kai-diplou-mentese-typou-lbp-820-821-lbp/>>, 1 page.

(56) References Cited

OTHER PUBLICATIONS

"System Plast LF 820 K400 Acetal Straight Running Chain, 4 Width, 120" Length, Single Hinge", retrieved on Sep. 10, 2015, at <<http://www.amazon.com/System-Plast-Acetal-Straight-Running/dp/B00MJXUDIA>>, 3 pages.
Elliott, Amy-Mae, "9 Nifty Laptop Feet to Keep Your PC Running Cool", published on Jul. 30, 2012, retrieved at <<http://mashabla.com/2012/07/30/laptop-feet/>>, 26 pages.
"Multi-function stainless steel hydraulic shower door pivot hinge", retrieved on Sep. 10, 2015 at <<http://www.alibaba.com/product-detail/Multi-function-stainless-steel-hydraulic-shower_60153561047.html>> 10 pages.
"Straight Running Chains", published Jul. 15, 2013, retrieved at <<http://www.ultraplastindia.com/stainless-steel-slat-chains.html>>, 2 pages.
Non-Final Office Action dated Feb. 22, 2016 from U.S. Appl. No. 14/538,775, 23 pages.
Response filed Jun. 29, 2016 to the Non-Final Office Action dated Feb. 22, 2016 from U.S. Appl. No. 14/538,775, 12 pages.
International Search Report dated Jan. 4, 2016 from PCT Patent Application No. PCT/US2015/059798, 13 pages.
Article 34 Demand filed May 4, 2016 from PCT Patent Application No. PCT/US2015/059798, 17 pages.
Non-Final Office Action dated Mar. 29, 2016 from U.S. Appl. No. 14/588,138, 34 pages
Response filed Jun. 29, 2016 to the Non-Final Office Action dated Mar. 29, 2016 from U.S. Appl. No. 14/588,138, 10 pages.
Final Office Action dated Jul. 29, 2016 from U.S. Appl. No. 14/588,138, 31 pages.
International Search Report and Written Opinion dated Feb. 22, 2016 from PCT Patent Application No. PCT/US2015/064173, 13 pages.
Response and Demand filed Jun. 15, 2016 from PCT Patent Application No. PCT/US2015/064173, 13 pages.
Non-Final Office Action dated Dec. 10, 2015 from U.S. Appl. No. 14/606,979, 20 pages.
Response filed Mar. 3, 2016 to the Non-Final Office Action dated Dec. 10, 2015 from U.S. Appl. No. 14/606,979, 16 pages.
Final Office Action dated Jun. 1, 2016 from U.S. Appl. No. 14/606,979, 48 pages.
Response filed Aug. 26, 2016 to the Final Office Action dated Jun. 1, 2016 from U.S. Appl. No. 14/606,979, 15 pages.
Applicant-Initiated Interview Summary dated Aug. 29, 2016 from U.S. Appl. No. 14/606,979, 3 pages.
International Search Report and Written Opinion dated Apr. 12, 2016 from PCT Patent Application No. PCT/US2016/013815, 19 pages.
Non-Final Office Action dated Apr. 12, 2016 from U.S. Appl. No. 14/555,184, 32 pages.
Response filed Jun. 29, 2016 to the Non-Final Office Action dated Apr. 12, 2016 from U.S. Appl. No. 14/555,184, 10 pages.
Notice of Allowance dated Jul. 14, 2016 from U.S. Appl. No. 14/555,184, 15 pages.
Corrected Notice of Allowability dated Aug. 4, 2016 from U.S. Appl. No. 14/555,184, 16 pages.
International Search Report dated Jan. 25, 2016 from PCT Patent Application No. PCT/US2015/060959, 11 pages.
Article 34 Demand filed Jun. 8, 2016 from PCT Patent Application No. PCT/US2015/060959, 14 pages.
Non-Final Office Action dated Mar. 31, 2016 from U.S. Appl. No. 14/538,786, 16 pages.
Response filed Jun. 30, 2016 to the Non-Final Office Action dated Mar. 31, 2016 from U.S. Appl. No. 14/538,786, 12 pages.
International Search Report dated Jan. 4, 2016 from PCT Patent Application No. PCT/US2015/059799, 13 pages.
Notice of Allowance dated May 18, 2017 from U.S. Appl. No. 14/588,138, 41 pages.
International Preliminary Report on Patentability dated Apr. 4, 2017 from PCT Patent Application No. PCT/US2016/013815, 9 pages.
Communication pursuant to Rules 161(1) and 162 EPC dated Jun. 21, 2017 from European Patent Application No. 15797752.1, 2 pages.
Communication pursuant to Rules 161(1) and 162 EPC dated Jun. 21, 2017 from European Patent Application No. 15797753.9, 2 pages.
Article 34 Amendment filed Jun. 14, 2017 from Korean Patent Application No. 10-2017-7015834, 10 pages. (No English Translation).
Demand filed Jun. 7, 2017 with Response to the International Search Report and Written Opinion from PCT Patent Application No. PCT/US2016/048898, 14 pages.
Notice of Allowance and Examiner-Initiated Interview Summary dated Jul. 10, 2017 from U.S. Appl. No. 14/538,775, 19 pages.
Notice of Allowability dated Jul. 10, 2017 from U.S. Appl. No. 14/588,138, 6 pages.
Response filed Jul. 20, 2017 to the Communication pursuant to Rules 161(1) and 162 EPC dated Jun. 21, 2017 from European Patent Application No. 15797752.1, 6 pages.
Final Office Action dated Jul. 19, 2017 from U.S. Appl. No. 14/866,697, 40 pages.
Communication pursuant to Rules 161(1) and 162 EPC dated Jul. 4, 2017 from European Patent Application No. 15801625.3, 2 pages.
Communication pursuant to Rules 161(1) and 162 EPC dated Aug. 8, 2017 from European Patent Application No. 15816331.1, 2 pages.
Article 34 Amendment filed Aug. 1, 2017 from Korean Patent Application No. 10-2017-7021309, 36 pages. (No English Translation).
Response filed Aug. 15, 2017 to the Final Office Action dated Mar. 15, 2017 from U.S. Appl. No. 14/606,979, 12 pages.
Second Written Opinion dated Aug. 1, 2017 from PCT Patent Application No. PCT/US2016/048898, 9 pages.
Notice of Allowability dated Sep. 1, 2017 from U.S. Appl. No. 14/588,138, 16 pages.
Response filed Sep. 13, 2017 to the Final Office Action dated Jul. 19, 2017 from U.S. Appl. No. 14/866,697, 11 pages.
Applicant Initiated Interview Summary dated Sep. 18, 2017 from U.S. Appl. No. 14/866,697, 3 pages.
Notice of Allowance dated Sep. 26, 2017 from U.S. Appl. No. 14/866,697, 13 pages.
Non-Final Office Action dated Oct. 27, 2017 from U.S. Appl. No. 14/606,979, 23 pages.
"360 deg Hinge Video," published Jul. 21, 2013, retrieved at <<https://www.youtube.com/watch?v=lhEczMi4nsw>> on Aug. 17, 2016, 1 page.
"Special Purpose Hinges (cont.)," published Jan. 4, 2007, retrieved at <<http://hingedummy.info/specialpurposepage2.htm>> on Aug. 17, 2016, 2 pages.
Smith, Daria, "Microsoft Helps HP Design New Convertible Spectre x360," published Mar. 3, 2015, retrieved at <<http://blog.parts-people.com/2015/03/03/microsoft-helps-hp-design-ne-convertible-spectre-x360/>>, 1 page.
International Search Report and Written Opinion dated Nov. 23, 2017 from PCT Patent Application No. PCT/US2017/051683, 15 pages.
Non-Final Office Action dated Jun. 9, 2017 from U.S. Appl. No. 15/256,302, 17 pages.
Response filed Sep. 11, 2017 from U.S. Appl. No. 15/256,302, 9 pages.
Final Office Action dated Feb. 27, 2018 from U.S. Appl. No. 14/606,979, 8 pages.
International Preliminary Report on Patentability dated Jan. 2, 2018 from PCT Patent Application No. PCT/US2016/048898, 20 pages.
"Non Final Office Action Issued in U.S. Appl. No. 15/360,652", dated Oct. 6, 2017, 10 Pages.
"Final Office Action Issued in U.S. Appl. No. 15/360,652", dated May 3, 2018, 8 Pages.

\* cited by examiner

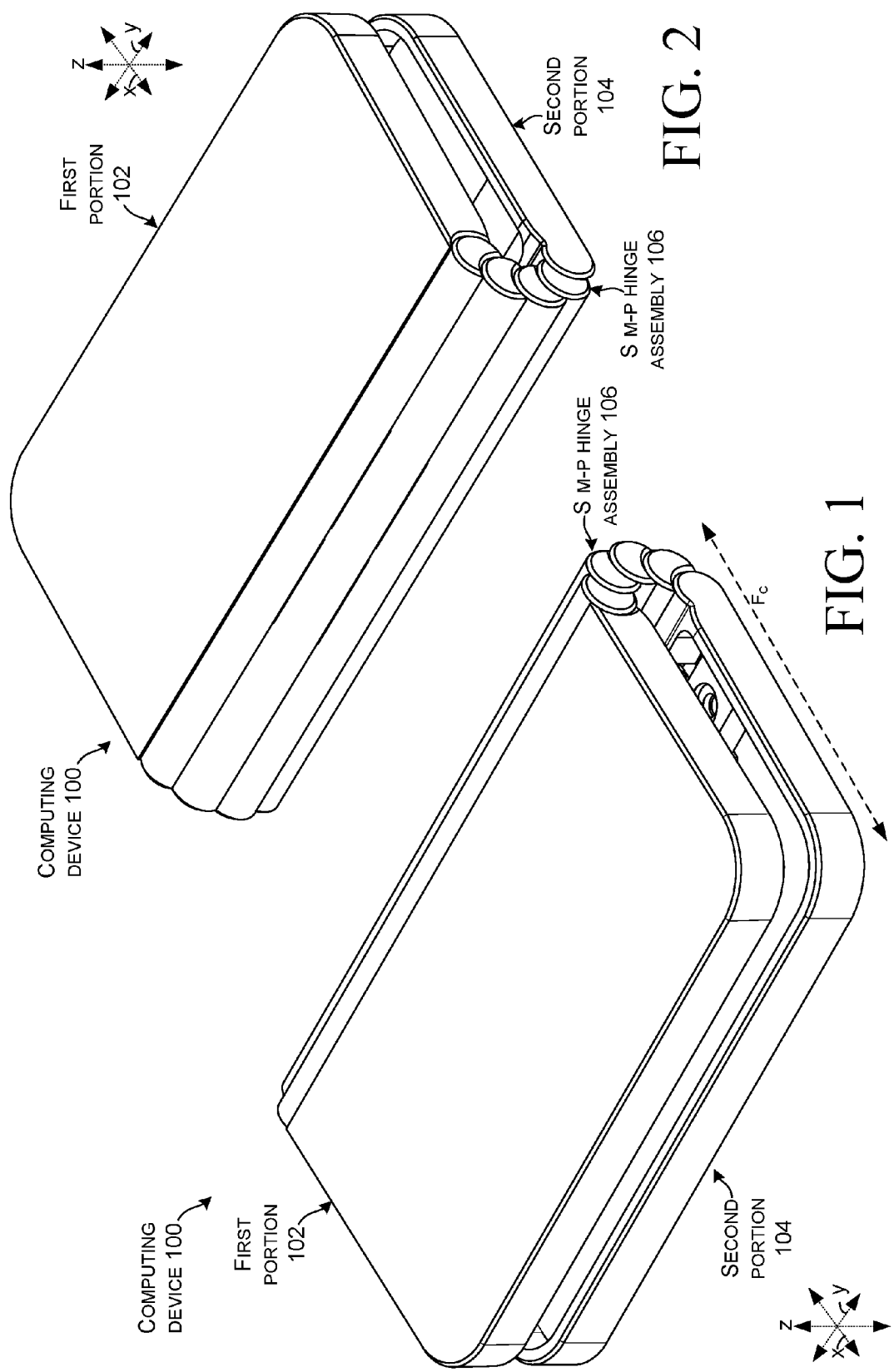

MULTI-PIVOT HINGE

CROSS-REFERENCE TO RELATED APPLICATIONS

This patent application is a continuation of, and claims priority to, U.S. patent application Ser. No. 14/555,184, filed on Nov. 26, 2014, which is incorporated herein by reference in its entirety.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1-4 show perspective views of an example device that includes a sequential multi-pivot hinge assembly example in accordance with some implementations of the present concepts.

FIG. 8A is a perspective view of an individual link from FIG. 8.

DESCRIPTION

The present concepts relate to computing devices employing multi-pivot or multi-axis hinge assemblies to rotatably secure portions of the computing device. The present hinges can be thought of as sequential hinges in that the multi-pivot hinge assemblies can control a relative order in which individual hinges rotate. One such configuration can cause the hinges to operate in a predefined order from first to last (e.g., sequentially). As such, the multi-pivot hinge assemblies can be termed 'sequential multi-pivot hinge assemblies'.

Figure 3:
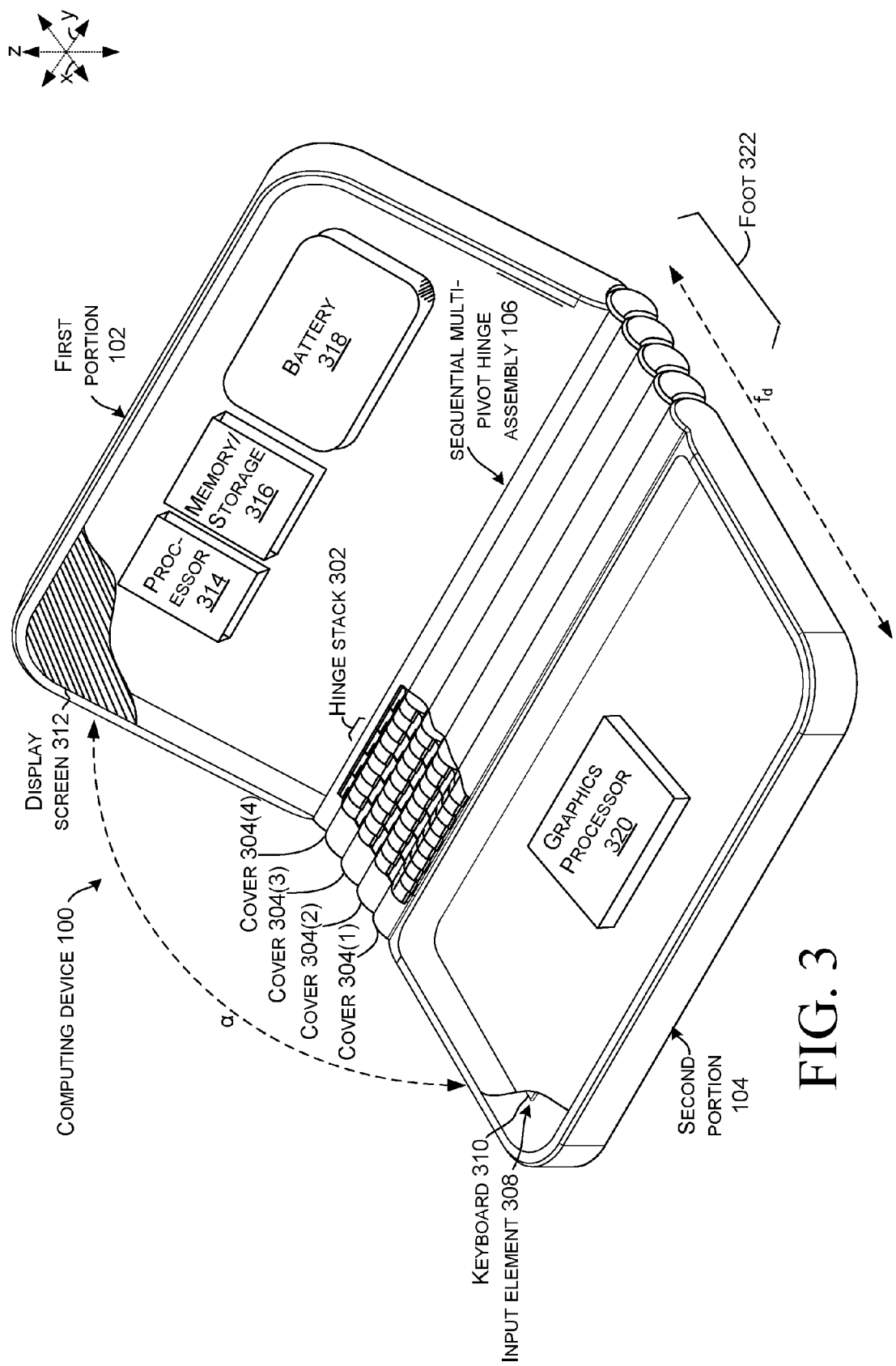

Introductory FIGS. 1-3 collectively show an example of a computing device 100. In this example, computing device 100 has first and second portions 102 and 104 that are rotatably secured together by a sequential multi-pivot hinge assembly 106. FIGS. 1-2 show the computing device in a 'closed' position. FIG. 1 shows the computing device 100 from the 'front' and FIG. 2 shows the computing device from the 'back.' FIG. 3 is a partial cut-away perspective view that shows the computing device in an 'open' or 'deployed' position. In this example, in the deployed position, the first and second portions can define an obtuse angle α relative to one another, as opposed to an angle close to zero in the closed position of FIGS. 1-2. In other implementations, the deployed position can be 90 degrees or less or 180 degrees or more (e.g., a book like configuration). For instance, the deployed position may be somewhere in the range of 90 degrees to 180 degrees that is a comfortable viewing angle for the user.

As can be appreciated from FIG. 3, the sequential multi-pivot hinge assembly 106 can include multiple hinge stacks 302. Aspects of the sequential multi-pivot hinge assembly 106 are described in more detail below relative to FIGS. 5-10. In this example, the sequential multi-pivot hinge assembly includes rigid articulating hinge covers 304 that can obscure and/or protect the underlying elements, including the hinge stacks 302. Other implementations do not include the rigid articulating covers. Still other implementations can include a flexible hinge cover that extends between the first portion 102 and the second portion 104 over the sequential multi-pivot hinge assembly 106.

As evidenced in FIG. 3, computing device 100 can also include an input element or device 308. In this case the input device 308 is manifest as a keyboard 310. Other implementations can employ other input devices. In this example, the computing device can also include a display screen 312, such as a touch sensitive display screen. The computing device can also include a processor 314, memory/storage 316, a battery 318, and/or a video or graphics processor 320, among other components/elements. These elements can be positioned in the first portion 102 and/or second portion 104.

In this case, the second portion 104 can be configured to be positioned on a generally horizontal surface (not specifically designated), such as a table top. In the closed position of FIGS. 1-2, the first and second portions are generally parallel to one another and the horizontal surface (e.g., the first portion is juxtaposed over the second portion). In contrast, in the deployed position of FIG. 3, the first portion is rotated away from the second portion, in this case to an obtuse angle.

Note that in the closed position of FIGS. 1-2, the sequential multi-pivot hinge assembly 106 can provide a footprint $f_c$ that is compact and easy to carry. Note also, that in this implementation the progressive or sequential nature of the sequential multi-pivot hinge assembly 106 can increase or expand the footprint of the computing device when the device is transitioned from the closed or storage position of FIGS. 1-2 to the open or deployed position of FIG. 3. For example, compare the closed footprint $f_c$ to the deployed or expanded footprint $f_d$. This extended footprint feature can be especially valuable in this implementation where some or all of the electronic components, such as the display 312, processor 314, memory/storage 316, and battery 318 are positioned in the first portion 102. The extended footprint provided by the sequential multi-pivot hinge assembly can increase stability of the computing device and reduce the likelihood of the device tipping over backward in the deployed position from the weight of these components. Stated another way, the sequential nature of the sequential multi-pivot hinge assembly can create a foot 322 in the deployed position that can help stabilize the computing device 100 and decrease tipping (e.g., maintain the center of mass over the footprint).

In the implementation shown in FIG. 3, the sequential multi-pivot hinge assembly 106 can be secured to the first and second portions 102 and 104 in a relatively permanent manner (e.g., in a manner that is not intended to be readily separable by an end use consumer). Alternatively, the sequential multi-pivot hinge assembly 106 can be secured to the first and second portions 102 and 104 in a relatively quickly attachable/detachable manner (e.g., in a manner that is intended to be readily separable by the end use consumer). One such example of this latter configuration is shown in FIG. 4.

Figure 4:
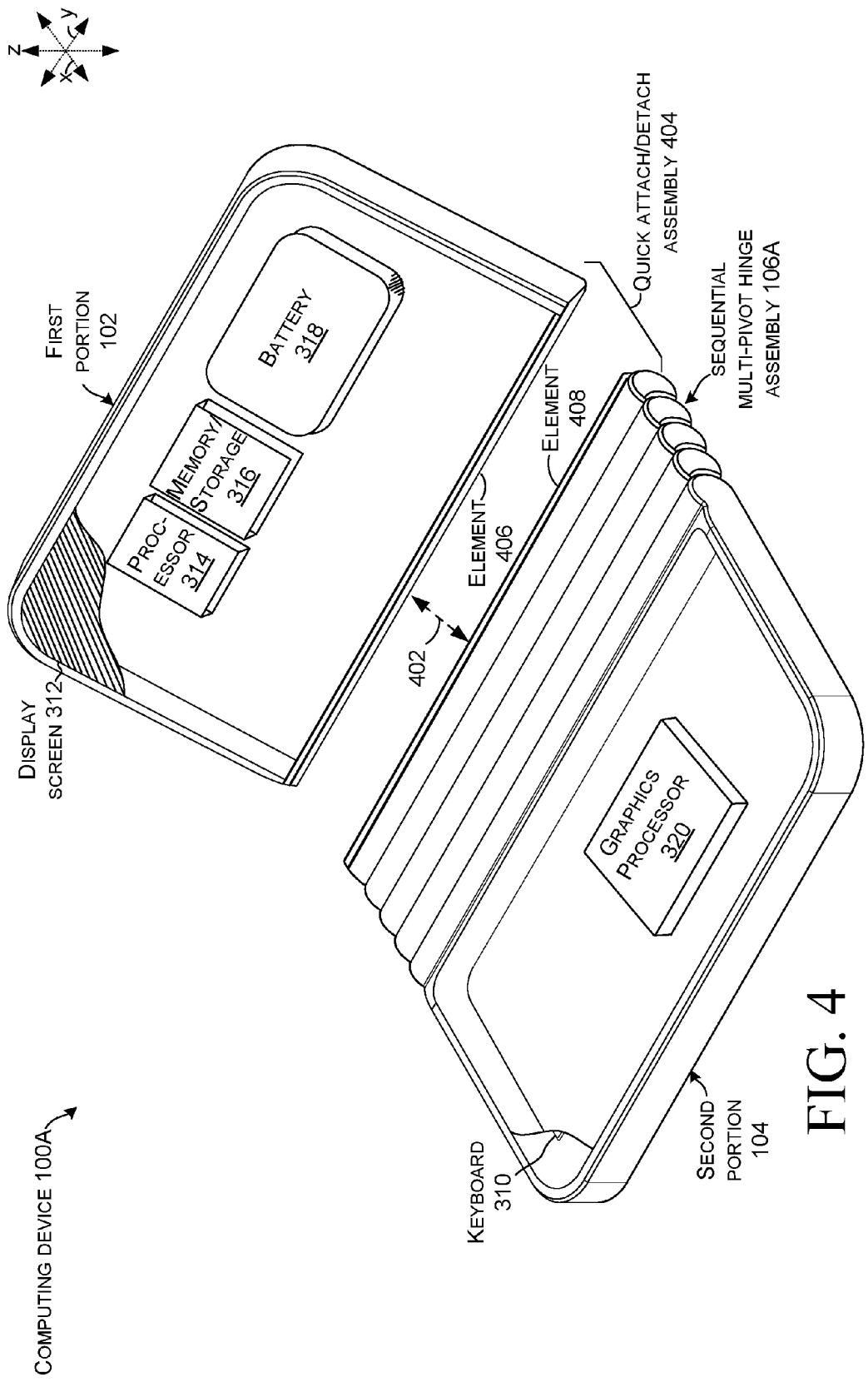

FIG. 4 shows another computing device 100A in a view that is similar to the view of FIG. 3. In this example, the sequential multi-pivot hinge assembly 106A is configured to allow an end use consumer to easily detach either or both of the first and second portions 102 and 104 from the sequential multi-pivot hinge assembly 106A as indicated by arrow 402. In this example the sequential multi-pivot hinge assembly 106 can include a quick attach/detach assembly 404. The quick attach/detach assembly 404 may include cooperatively operating elements 406 and 408 located on the first portion 102 and the sequential multi-pivot hinge assembly 106A, respectively.

In one example, element 406 can be manifest as a latch and element 408 can be manifest as a receiver. The latch can engage the receiver to removeably couple the first portion 102 with the sequential multi-pivot hinge assembly 106A. In another example, the elements 406 and 408 may magnetically couple to one another in a manner that can be overcome by the user to separate the first portion from the sequential multi-pivot hinge assembly 106A. Other quick attach/detach assemblies 404 are contemplated. The sequential multi-pivot hinge assembly 106A may detachably connect with either or both of the first and/or second portions. Alternatively or additionally to mechanical coupling, the quick attach/detach assembly 404 can detachably electrically couple electronic components of the first and second portions. For instance, the quick attach/detach assembly 404 may electrically couple processor 314, storage/memory 316, and/or battery 318 from the first portion 102 to the graphics processor 320 and/or keyboard 310 in the second portion 104.

Thus, the quick attach/detach assembly 404 can allow the user to be able to detach first portion 102 or second portion 104 to use either portion independently of the other. For example, first portion 102 may be operated as a stand-alone tablet device, and then may be attached to second portion 104 via sequential multi-pivot hinge assembly 106A to form a device more akin to a laptop device. A user may also be able to exchange first portion 102 or second portion 104 for application-specific devices. For example, an individual second portion may include a keyboard and/or a touchscreen. In certain scenarios, the user may attach a first touchscreen as the first portion and a second touchscreen as the second portion, and utilize the device like a book. In other scenarios, a user may attach a touchscreen as the first portion and an input device, manifest as a keyboard and trackpad, as the second portion, and utilize the device like a laptop. Other configurations and implementations are contemplated.

Figure 5:
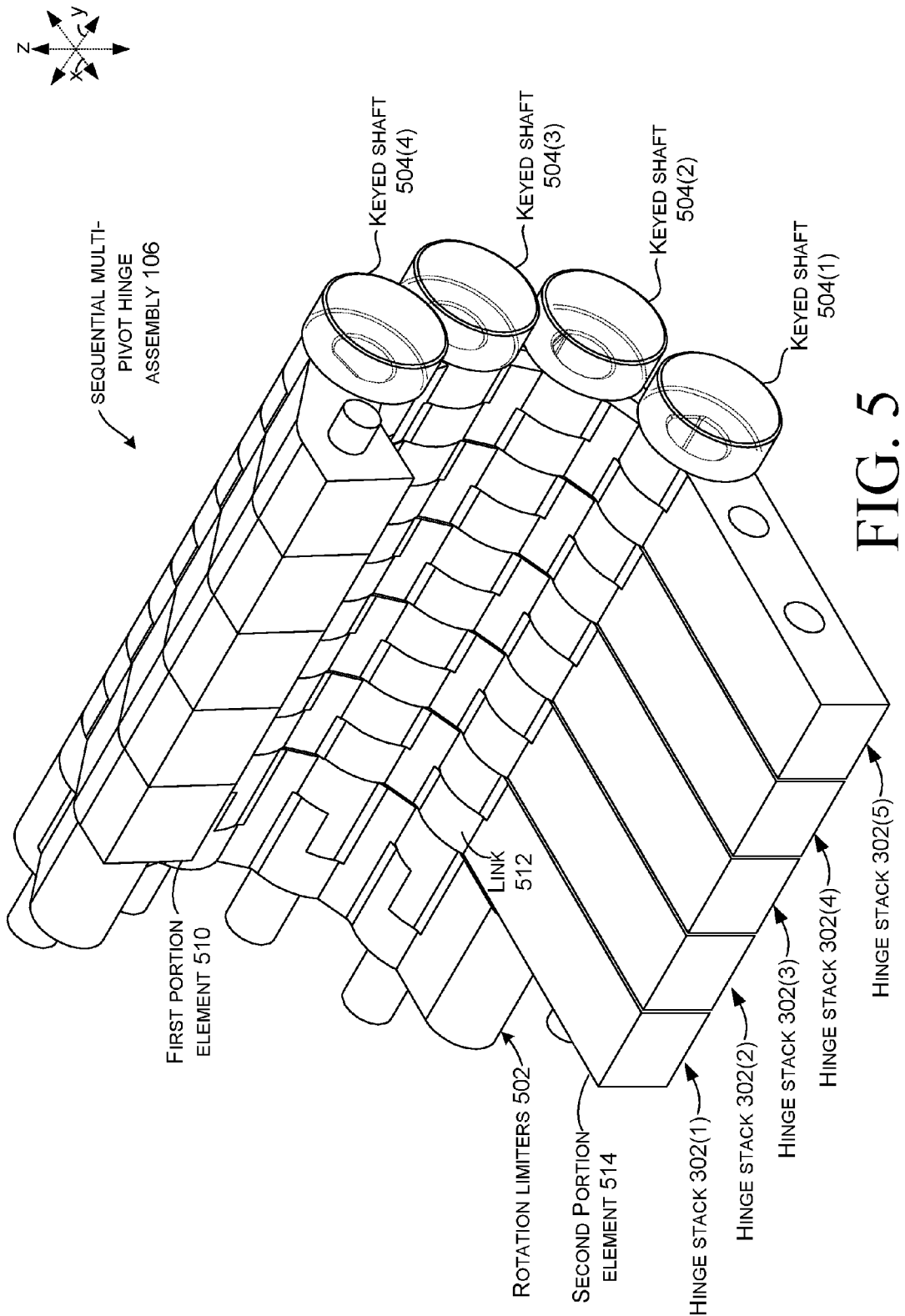
FIGS. 5-6 are perspective views and FIG. 7 is an exploded perspective view of a sequential multi-pivot hinge assembly example in accordance with some implementations of the present concepts.
Figure 6:
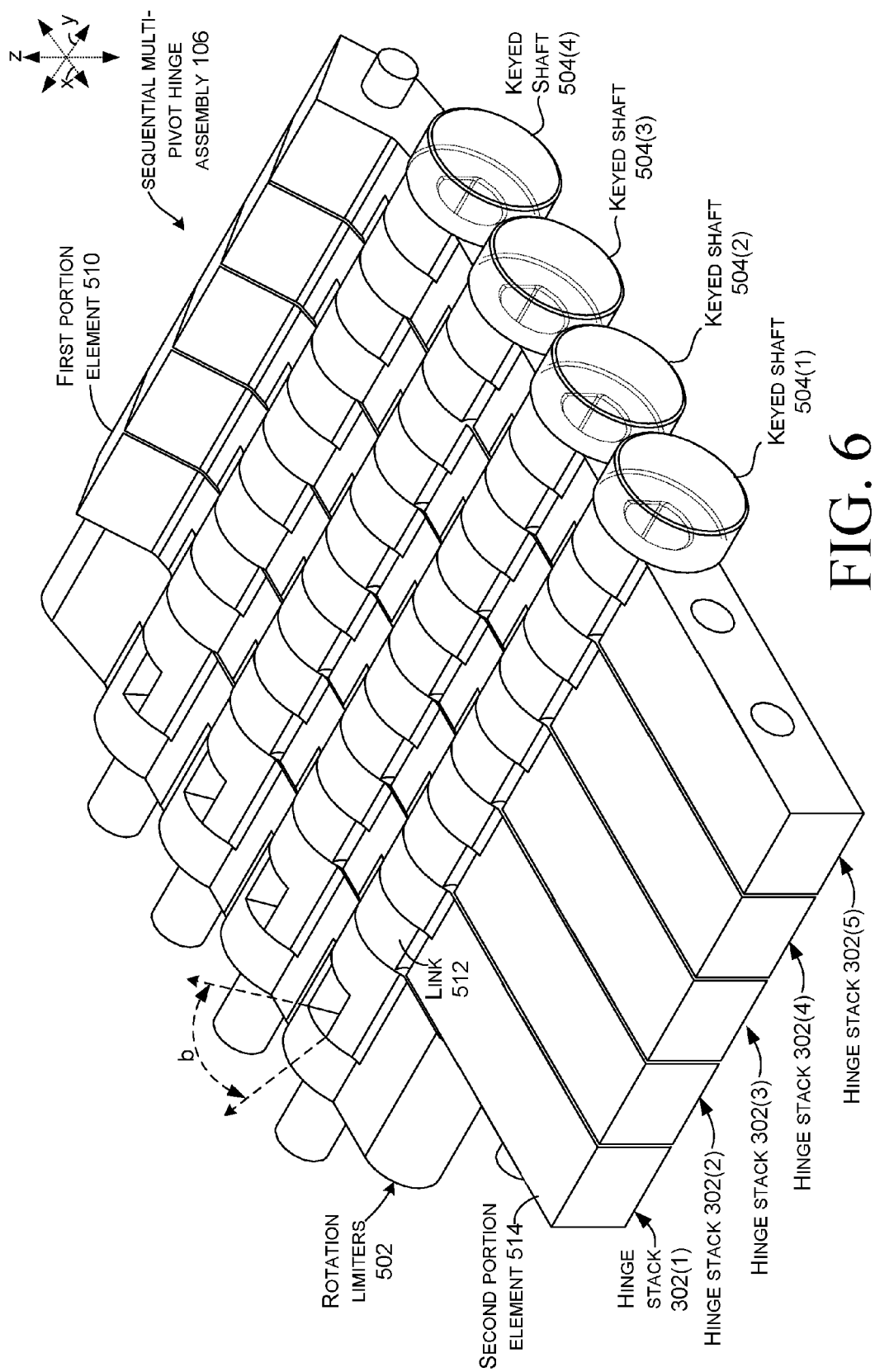
Figure 7:
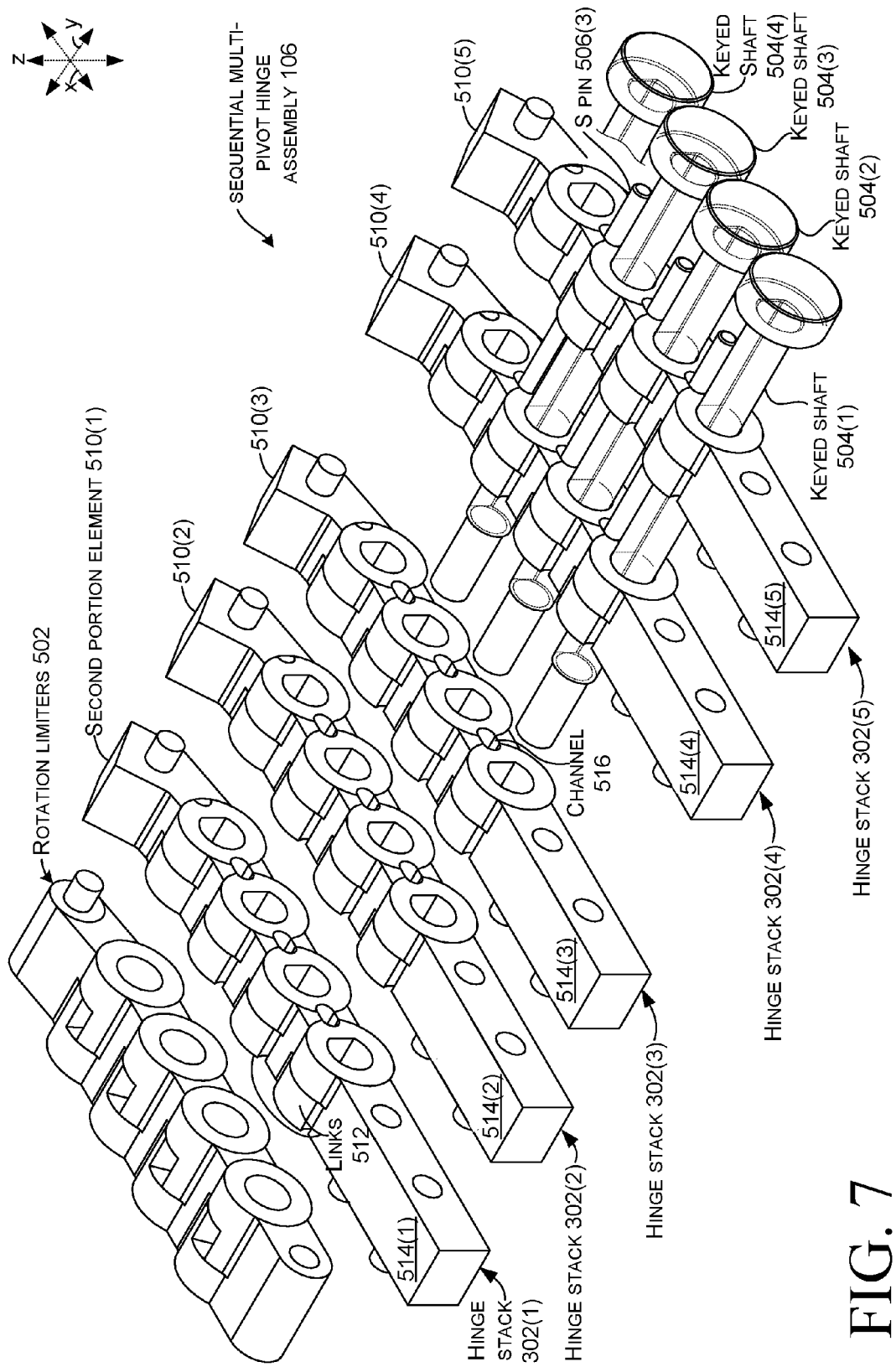
Figure 8:
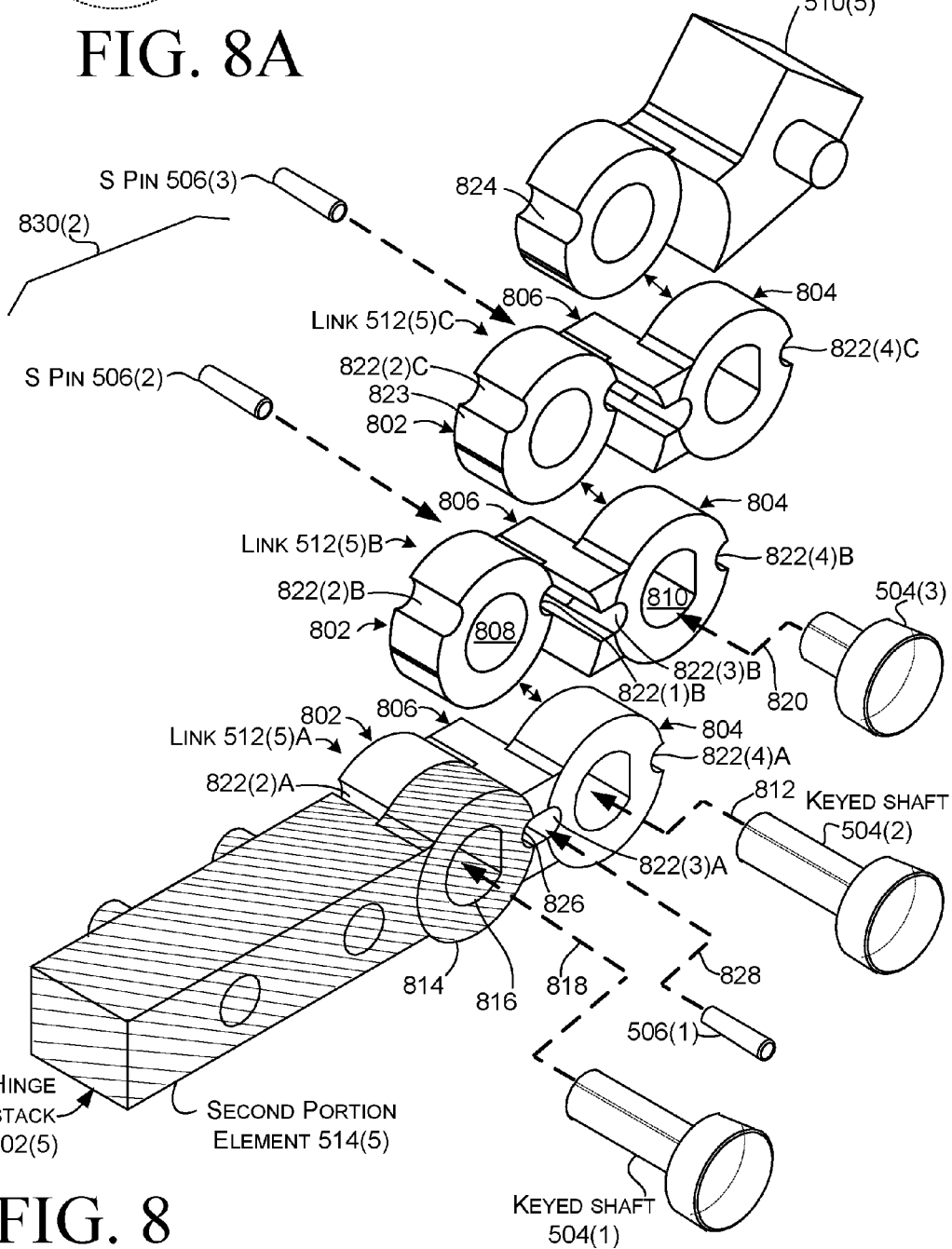
FIG. 8 is an exploded perspective view of an individual hinge stack example introduced in FIG. 7.

FIGS. 5-10 collectively illustrate more details about the example sequential multi-pivot hinge assembly 106 including the hinge stacks 302 introduced above relative to FIG. 3. Note that due to space constraints on the drawing pages, not all elements are labeled in each FIG. and not every instance of every element is labeled, rather representative elements are labeled. FIG. 5 shows the sequential multi-pivot hinge assembly 106 in a closed or storage position similar to FIG. 1. FIG. 6 shows the sequential multi-pivot hinge assembly 106 in an open or deployed position similar to FIG. 3. FIG. 7 shows an exploded view similar to the view of FIG. 6. FIG. 8 is an exploded view of an individual hinge stack 302(5).

Referring to FIGS. 5-8, the example sequential multi-pivot hinge assembly 106 can include rotation limiters 502, keyed shafts 504, sequencing pins 506 (FIG. 7). Individual hinge stacks 302 can include a first portion element 510, multiple radially arranged links 512, and a second portion element 514. The keyed shafts 504 pass through the hinge stacks 302 and the rotation limiters 502. The keyed shafts 504 define the axes of rotation the links 512 rotate (or pivot) around. The sequencing pins can be thought of as a type of locking cam member that reside in channels 516 (FIG. 7) formed through the links 512. Various types of rotation limiters 502 can be utilized. As illustrated relative to FIG. 6, individual rotation limiters can define the degrees of rotation b (FIG. 6) around an individual axis of rotation.

FIG. 8 shows a partially exploded individual hinge stack 302(5). In this case, link 512(5)A is positioned against second portion element 514(5). In this view the second portion element 514(5) is shown with cross-hatching to aid the reader in distinguishing the second portion element from the link 512(5)A. Note that individual links 512 have an offset configuration with a first region 802 connected to a second region 804 by a central region 806. Note that FIG. 8 includes a large number of structures and designators. For clarity purposes, FIG. 8A shows an individual link 512(5) in isolation with the individual first region 802, second region 804 and central region 806 circled. From one perspective the offset nature of the individual links can be characterized as approximating a portion of a lightning bolt shape (e.g., when viewed along the xz reference plane).

Referring to FIG. 8 and FIG. 8A, the first region 802 can define a first passageway 808. Similarly, the second region 804 can define a second passageway 810 that is parallel to the first. The first region 802 of an individual link, such as link 512(5)B can be aligned with the second region 804 of an adjacent link, such as link 512(5)A to receive an individual keyed shaft 504, such as keyed shaft 504(2) as indicated by arrow 812.

The link's central region 806 can extend generally parallel to a hinge axis defined by the keyed shaft 504. As such, the central region 806 can extend generally parallel to the keyed shaft 504 to support an offset configuration of the link 512(5) where the first and second regions 802 and 804 can define parallel but offset passageways 808 and 810. Thus, in this example, as mentioned above, first region 802 of link 512(5)B can be positioned against the second region of link 512(5)A to receive keyed shaft 504(2) as indicated by arrow 812. The first region 802 of link 512(5)A can in turn be aligned with the second portion element 514(5). The second portion element can include a terminus 814. The terminus can define a passageway 816. Keyed shaft 504(1) can pass through the passageway 816 and passageway 808 of link 822(2)A (passageway 808 of link 822(2)A is not visible, but the passageway is designated relative to link 512(5)B) to rotatably join the second portion element 514(5) to the link 512(5)A as indicated by arrow 818. Similarly, keyed shaft 504(3) can rotatably join the second region 804 of link 512(5)B to the first region 802 of link 512(5)C as indicated by arrow 820.

Note that in this implementation, the keyed shafts 504 do not have a circular profile when viewed transverse their long axis (e.g., when viewed along the xz reference plane). Instead in this case, the keyed shafts have a profile that approximates a capital "D". Second passageway 810 has a similar profile so that the keyed shaft is keyed or locked relative to the second region 804. In contrast, the first passageway 808 has a circular profile. This configuration can allow the 'back' link to rotate around the keyed shaft while preventing the 'front' link from rotating around the keyed shaft. Thus, it is contemplated that other keyed shaft profiles can be utilized that cause the keyed shaft to be non-rotatable relative to a first link and rotatable relative to a second link. For instance, a star shaped profile could be utilized where the front link's passageway matches the star profile and the back link is circular with a diameter defined by the outer points of the star.

An individual link 512, such as link 512(5)B can define a number of cam surfaces 822. In this example, the link can define four designated cam surfaces 822. A first individual cam surface 822(1) can be formed in first region 802 proximate to central region 806. A second individual cam surface 822(2) can be formed in the first region 802 away from the central region. Similarly, a third individual cam surface 822(3) can be formed in the second region 804 proximate to the central region 806 and a fourth individual cam surface 822(4) can be formed in the first region 802 away from the central region. Note that cam surfaces 822(1) and 822(3) of an individual link 512(5) can partially define channel 516 and thus prescribe a fore-aft translational degree of freedom (e.g., in the x reference direction relative to FIG. 8) for an individual sequencing pin 506. Thus, in some cases, as will be described in more detail below, cam surfaces 822(1) and 822(3) simply define channel 516 (FIG. 7), while surfaces 822(2) and 822(4) are involved in controlling rotation by individual links. Also note that not all cam surfaces are specifically discussed and designated. For instance, an additional cam surface 823 (designated only relative to link 512(5)C can work cooperatively with cam surface 822(2)C to move sequencing pin 506(2) translationally (e.g., in the negative x reference direction relative to FIG. 8). Note also that first portion element 510(5) has a cam surface 824 that operates cooperatively with link 512(5)C and second portion element 514(5) has a cam surface 826 that operates cooperatively with link 512(5)A to receive sequencing pin 506(1) as indicated by arrow 828. From one perspective, the cam surfaces and sequencing pins can function as a rotation control element or rotation control sub-assembly 830. For instance, cam surface 822(4)A of link 512(5)A, cam surface 822(2)C of link 512(5)C, and sequencing pin 506(2) function as rotation control element 830(2) to control when rotation occurs around the rotation axis defined by keyed shaft 504(3) relative to rotation around keyed shafts 504(2) and 504(4) (FIG. 7). Other rotation control elements 830 are contemplated.

Figure 9:
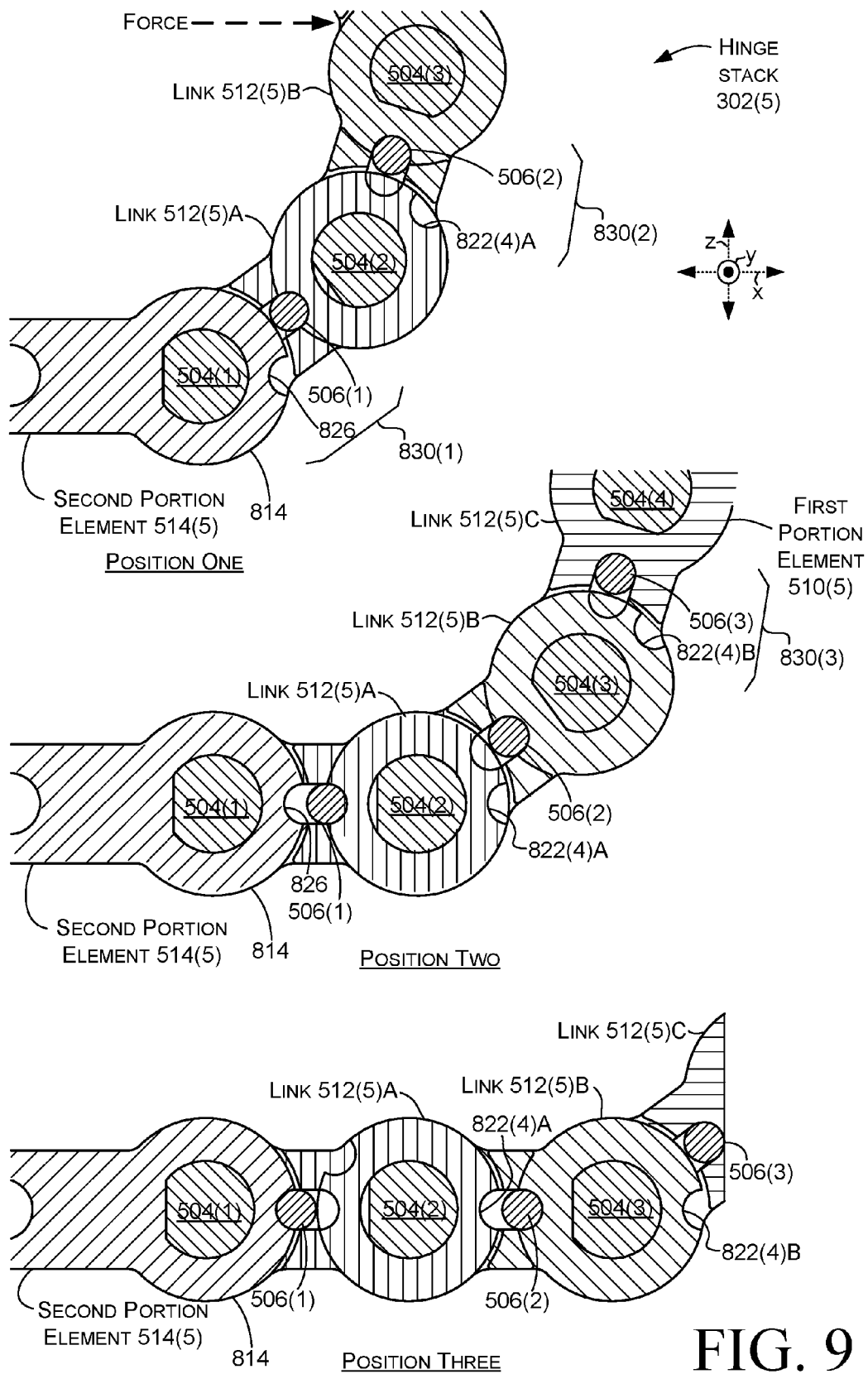
FIGS. 9-10 show elevational views of a sequential multi-pivot hinge assembly example in accordance with some implementations of the present concepts.

FIG. 9 shows sectional views of hinge stack 302(5) in three positions. These sectional views are taken along the xz reference plane. Position One is analogous to the closed position of FIG. 5. In this case, a force is being applied to the hinge stack in the positive x direction. Relative to rotation control elements 830(1) the force can cause link 512(5)A to rotate around keyed shaft 504(1). However, note that relative to rotation control elements 830(2), rotation around keyed shaft 504(2) is blocked because sequencing pin 506(1) is engaging cam surface 822(2)B (hidden from view in FIG. 9, see FIG. 8) of link 512(5)B. Sequencing pin 506(1) cannot be cammed away from cam surface 822(2)B because at this point the sequencing pin 506(1) is not aligned with cam surface 826 of terminus 814. Similarly, relative to rotation control elements 830(3) (Position Two) sequencing pin 506(2) is blocking rotation around keyed shaft 504(3) since sequencing pin 506(2) is engaging cam surface 822 (2)C (see FIG. 8) of link 512(5)C and is not aligned with cam surface 822(4)A of link 512(5)A.

Position Two shows rotation around keyed shaft 504(1) to a point where camming surface 826 is aligned with sequencing pin 506(1) and camming surface 822(2)B of link 512 (5)B (hidden from view). At this point, the force can begin to cause rotation around keyed shaft 504(2) and camming surface 822(2)B of link 512(5)B (See FIG. 8) can cam (e.g., move) sequencing pin 506(1) in the negative x reference direction (e.g., toward camming surface 826) and continue rotating around keyed shaft 504(2).

Position Three is an intermediary position (e.g., partially deployed) between the closed position of FIG. 5 and the deployed position of FIG. 6 and shows rotation around keyed shaft 504(3) to a point where cam surface 822(4) of link 512(5)A is aligned with sequencing pin 506(2). Because there is now a place for sequencing pin 506(2) to move to, the force can cause camming surfaces 822(2)C and 823 (see FIG. 8) of link 512(5)C to cam the sequencing pin in the negative x reference direction as rotation commences around keyed shaft 504(3). This process can be repeated for sequencing pin 506(3) and keyed shaft 504(3).

Figure 10:
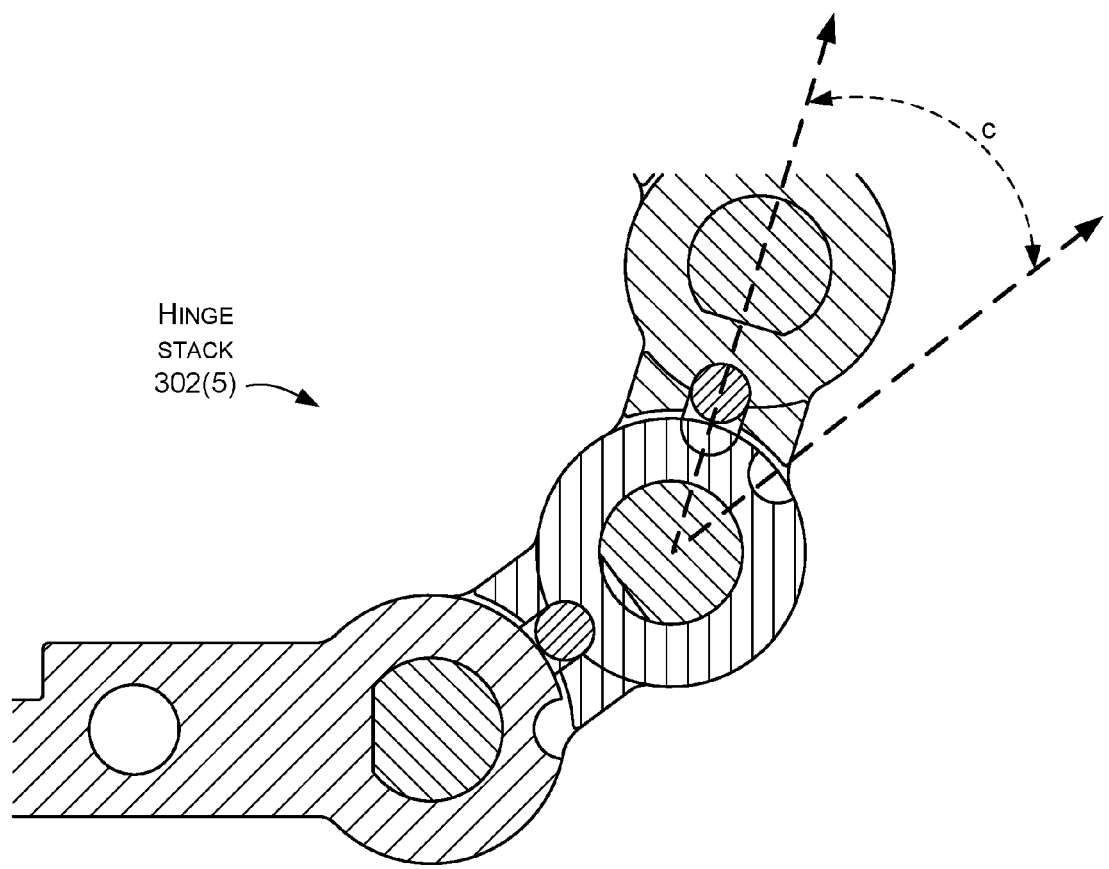

Thus, starting in the closed position of Position One, when a force is applied to the hinge stack 302(5) (e.g., to the sequential multi-pivot hinge assembly) rotation starts at the hinge axis (e.g., keyed shaft 504(1)) closest to the second portion 104. Rotation around the next closest hinge axis cannot commence until rotation around the closest hinge axis has completed a defined range of rotation of the camming surfaces (See angle c of FIG. 10. FIG. 10 is similar to Position One of FIG. 9). This process is repeated in a sequential manner from closest to the second portion to furthest from the second portion. In a similar manner when the process is reversed to close the computing device, rotation begins around the hinge axis furthest from the second portion and moves toward the second portion only as each hinge axis completes its defined rotation and the respective sequencing pin 506 can move in the positive x reference direction. Thus, the rotation control elements can control the relative order of rotation around individual hinge axes of hinge stacks 302 of the sequential multi-pivot hinge assembly 106 (FIG. 7).

Thus, some implementations of the sequential multi-pivot hinge assembly can employ sliding sequencing elements, such as pins, that cam off opposing link cam surfaces to lock and unlock individual sequencing pins. This configuration can allow the sequential multi-pivot hinge assembly to roll and unroll in a controlled sequential manner that enables the hinge to be used as a foot to support a laptop like device, for example. The unrolling action can move the device fulcrum backwards providing a longer wheel base (e.g., extended footprint) for the device in turn making the device less likely to tip over when a user interacts with the touch screen.

Further, some implementations of the sequential multi-pivot hinge assembly can include multiple pivots or axes of rotation and links. Between each pivot, individual links can have a sliding (or otherwise moving) rotation locking element that is moved into position via camming action embedded within the links that forces the rotation locking element fore and aft to lock and unlock connecting links. The rotation locking element can enable communication between links to enable only one active pivot at a time.

EXAMPLE METHODS

Various methods of manufacture, assembly, and use for sequential multi-pivot hinge assemblies are contemplated beyond those shown above relative to FIGS. 1-10.

Additional Examples

Various examples are described above. Additional examples are described below. One example is manifest as a first portion that includes a display screen and a second portion that includes an input device. This example also includes a sequential multi-pivot hinge assembly rotatably securing the first portion and the second portion from a storage position where the first portion is juxtaposed over the second portion to a deployed position where the first portion is oriented at an obtuse angle relative to the first portion. The sequential multi-pivot hinge assembly can include multiple hinge stacks and rotation control elements. Individual hinge stacks can be coupled to the first and second portions and can include multiple radially arranged links that rotate around individual hinge axes. Individual rotation control elements can be interposed between individual adjacent links to control a relative order of rotation of the individual adjacent links depending upon whether the first portion and second portion are being rotated from the storage position to the deployed position or from the deployed position to the storage position Any combination of the above and/or below examples where the rotation control elements comprise sequencing pins.

Any combination of the above and/or below examples where the individual links have opposing offset first and second regions connected by a central region. Individual first regions can define first passageways and individual second regions define second passageways that are parallel to the first passageways. An individual first region of an individual first link can be rotatably secured to an individual second region of an individual second link by a shaft that defines an individual axis of rotation of the sequential multi-pivot hinge assembly. An individual second region of a third individual link can be secured to a first region of the second individual link via a second shaft.

Any combination of the above and/or below examples where the central region of the first link partially defines a channel in which an individual sequencing pin resides and wherein the individual first region of the individual first link defines a first cam surface and the individual second region of the third individual link defines a second cam surface. Also, a relative position of the individual sequencing pin relative to the first and second cam surfaces can determine whether the second individual link can rotate relative to the first individual link.

Any combination of the above and/or below examples where the shaft has a circular profile when viewed transverse the axis of rotation or wherein the shaft is not circular.

Any combination of the above and/or below examples where the shaft is key shaped and a profile of an individual first passageway of the first link matches a profile of the shaft and a profile of an individual second passageway of the second link is circular.

Any combination of the above and/or below examples where the rotation control elements prevent rotation around a second individual hinge axis until a first individual hinge axis has completed a defined number of degrees of rotation.

Any combination of the above and/or below examples where the sequential multi-pivot hinge assembly is configured to create a larger footprint of the computing device in the deployed position than in the storage position.

Any combination of the above and/or below examples where the sequential multi-pivot hinge assembly further comprises a rotation limiter to limit rotation around each axis of rotation to a defined number of degrees.

Any combination of the above and/or below examples where the sequential multi-pivot hinge assembly is visible when in both the storage position and the deployed position.

Any combination of the above and/or below examples further including a hinge cover.

Any combination of the above and/or below examples where the hinge cover comprises multiple rigid hinge covers or wherein the hinge cover comprises a flexible hinge cover that extends from the first portion to the second portion.

Another example is manifest as a first portion and a second portion. The example can include a sequential multi-pivot hinge assembly rotatably securing the first portion and the second portion and including rotation control elements configured to control a relative order of rotation around axes of rotation of the sequential multi-pivot hinge assembly.

Any combination of the above and/or below examples where the rotation control elements comprise locking cam members that engage cam surfaces defined on links that rotate around individual axes of rotation.

Any combination of the above and/or below examples where the locking cam members comprise elongate sequencing pins oriented parallel to the axes of rotation of the sequential multi-pivot hinge assembly.

Any combination of the above and/or below examples where the second portion defines a footprint of the computing device when the first portion is juxtaposed over the second portion in a storage position and when the first portion is rotated away from the second portion to an obtuse angle, the rotation control elements expand the footprint.

Any combination of the above and/or below examples further including electronic components positioned in the first portion and wherein a center of mass of the computing device is located above the expanded footprint.

Any combination of the above and/or below examples where the rotation control elements only allow rotation around a single axis of rotation at a time.

Another example is manifest as a first portion and a second portion. The example can include a sequential multi-pivot hinge assembly rotatably securing the first portion and the second portion to control rotation around individual axes starting proximate to the second portion when rotating the first and second portions apart and starting proximate to the first portion when moving the first and second portions toward one another.

Any combination of the above and/or below examples where the sequential multi-pivot hinge assembly includes rotation control elements. When the first and second portions are moving apart, the rotation control elements prevent rotation around an individual axis that is proximate to the first portion until rotation around another individual axis that is proximate to the second portion has completed a defined angle of rotation. When the first and second portions are moving toward one another the rotation control elements prevent rotation around the another individual axis until rotation around the individual axis has completed the defined angle of rotation.

Another example is manifest as a first portion and a second portion. The example can include a sequential multi-pivot hinge assembly rotatably securing the first portion and the second portion and configured to extend a footprint of the computing device when the first and second portions are rotated away from one another and to contract the footprint when the first and second portions are rotated toward one another.

Another example is manifest as a hinge having a first interface and a second interface. The hinge can also have a sequential multi-pivot hinge assembly rotatably securing the first interface and the second interface to control rotation around individual axes starting proximate to the second interface when rotating the first and second interfaces apart and starting proximate to the first interface when moving the first and second interfaces toward one another Any combination of the above and/or below examples where the sequential multi-pivot hinge assembly comprises rotation control elements. When the first and second interfaces are moving apart, the rotation control elements prevent rotation around an individual axis that is proximate to the first interface until rotation around another individual axis that is proximate to the second interface has completed a defined angle of rotation. When the first and second interfaces are moving toward one another the rotation control elements prevent rotation around the another individual axis until rotation around the individual axis has completed the defined angle of rotation.

Any combination of the above and/or below examples where the first interface comprises an electrical connector and a mechanical latch.

CONCLUSION

Although techniques, methods, devices, systems, etc., pertaining to sequential multi-pivot hinge assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising:
a first portion and a second portion; and,
a sequential multi-pivot hinge assembly rotatably securing the first portion and the second portion, the sequential multi-pivot hinge assembly controlling sequential rotation around individual axes such that the sequential rotation starts at a first individual axis that is closer to the first portion than the second portion when rotating the first and second portions toward one another and starts at a second individual axis that is closer to the second portion than the first portion when moving the first and second portions apart.

2. The computing device of claim 1, wherein the sequential multi-pivot hinge assembly comprises rotation control elements, and wherein when the first and second portions are moving apart, the rotation control elements prevent rotation around the first individual axis until rotation around the second individual axis has completed a defined angle of rotation, and wherein when the first and second portions are moving toward one the rotation control elements prevent rotation around the second individual axis until rotation around the first individual axis has completed the defined angle of rotation.

3. The computing device of claim 1, wherein the sequential multi-pivot hinge assembly electrically connects the first portion and the second portion.

4. The computing device of claim 1, wherein the sequential multi-pivot hinge assembly comprises multiple hinge stacks.

5. The computing device of claim 4, wherein an individual hinge stack comprises a first portion element that connects the first portion, a second portion element that connects the second portion, and multiple links.

6. The computing device of claim 5, further comprising keyed shafts that pass through the hinge stacks.

7. The computing device of claim 6, wherein the keyed shafts define the individual axes.

8. A computing device, comprising:
a first portion and a second portion;
hinge stacks, comprising:
a first portion element that connects the first portion,
a second portion element that connects the second portion, and,
links that connect the first portion element and the second portion element;
keyed shafts that pass through the hinge stacks; and,
sequencing pins that control a relative sequential order of rotation of the links about the keyed shafts.

9. The computing device of claim 8, wherein the keyed shafts define axes of rotation around which the links rotate.

10. The computing device of claim 9, further comprising rotation limiters that define an amount of rotation of the links around the axes of rotation.

11. The computing device of claim 8, wherein the hinge stacks electrically couple electronic components of the first and second portions of the computing device.

12. The computing device of claim 8, wherein the first portion of the computing device includes a display and the second portion of the computing device includes a keyboard.

13. The computing device of claim 8, wherein the first portion of the computing device includes a touchscreen.

14. A computing device, comprising:
a first portion and a second portion;
hinge stacks, comprising:
a first portion element that connects the first portion,
a second portion element that connects the second portion, and,
links that connect the first portion and the second portion;
keyed shafts that pass through the hinge stacks; and,
rotation control elements that control a relative sequential order of rotation of the links about the keyed shafts and prevent simultaneous rotation of the links about the keyed shafts.

15. The computing device of claim 14, wherein the relative sequential order of rotation comprises the rotation starting proximate to the second portion when rotating the first and second portions apart and the rotation starting proximate to the first portion when moving the first and second portions toward one another.

16. The computing device of claim 15, wherein, when rotating the first and second portions apart, rotation about an axis proximate the first portion is blocked until rotation about another axis proximate the second portion is complete.

17. The computing device of claim 14, wherein the rotation control elements comprise sequencing pins interposed between individual adjacent links of an individual hinge stack, the sequencing pins controlling an order of rotation of the individual adjacent links about individual axes of rotation.

18. The computing device of claim 17, further comprising rotation limiters that define an amount of rotation of the individual adjacent links around the individual axes of rotation.

19. The computing device of claim 14, wherein the links include cam surfaces, and the rotation control elements comprise sequencing pins interposed between individual adjacent links of an individual hinge stack that interact with the cam surfaces of the links.

* * * * *